(12) United States Patent
Schneegans

(10) Patent No.: US 8,479,907 B2
(45) Date of Patent: Jul. 9, 2013

(54) CLUTCH UNIT

(75) Inventor: Andre Schneegans, Edemissen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/554,899

(22) Filed: Jul. 20, 2012

(65) Prior Publication Data

US 2012/0318628 A1 Dec. 20, 2012

Related U.S. Application Data

(63) Continuation of application No. PCT/EP2010/006684, filed on Nov. 2, 2010.

(30) Foreign Application Priority Data

Jan. 20, 2010 (DE) .......................... 10 2010 005 036

(51) Int. Cl.
*F16D 13/70* (2006.01)
*F16D 13/72* (2006.01)

(52) U.S. Cl.
USPC .................................... 192/89.22; 192/113.24

(58) Field of Classification Search
USPC ................. 192/113.2, 113.23, 113.24, 89.22, 192/89.23, 89.24
See application file for complete search history.

(56) References Cited

U.S. PATENT DOCUMENTS

| 2,126,149 | A | * | 8/1938 | Spase | 192/70.27 |
| 3,340,974 | A | * | 9/1967 | Maucher | 192/70.3 |
| 4,657,128 | A | * | 4/1987 | Fujito et al. | 192/113.24 |
| 4,776,443 | A | * | 10/1988 | Maruyamano et al. | 192/70.12 |
| 4,886,153 | A | * | 12/1989 | Takenaka et al. | 192/70.12 |
| 4,923,043 | A | * | 5/1990 | Okuno | 192/70.12 |
| 5,421,438 | A | * | 6/1995 | Flotow et al. | 192/70.12 |

FOREIGN PATENT DOCUMENTS

| DE | 33 47 913 A1 | 6/1985 |
| DE | 10 2008 031 953 A1 | 1/2009 |
| EP | 0 198 747 A1 | 10/1986 |
| GB | 2 137 292 A | 10/1984 |
| JP | 5-231440 A * | 9/1993 |
| WO | WO 2007/000140 A2 | 1/2007 |

\* cited by examiner

*Primary Examiner* — Rodney Bonck
(74) *Attorney, Agent, or Firm* — Muncy, Geissler, Olds & Lowe, PLLC

(57) ABSTRACT

A clutch unit having a pressure plate via which, as a result of axial displacement, a clutch disc which bears friction linings can be pressed against a pressure plate to form a frictionally engaging connection, wherein the axial displacement of the pressure plate can be effected by means of an axial displacement of a lever spring plate which has a circular outer circumference and which bears against one or more protuberances arranged annularly on a surface, which faces toward the lever spring plate of the pressure plate so as to be spaced apart radially from the outer edge thereof, and wherein the pressure plate has, radially at the outside on that side thereof which faces towards the lever spring plate, an annular, axially projecting edge. At least three radial projections which are spaced apart in the circumferential direction are arranged on the radially inner wall of the axially projecting edge.

6 Claims, 2 Drawing Sheets

US 8,479,907 B2

CLUTCH UNIT

This nonprovisional application is a continuation of International Application No. PCT/EP2010/006684, which was filed on Nov. 2, 2010, and which claims priority to German Patent Application No. 10 2010 005 036.9, which was filed in Germany on Jan. 20, 2010, and which are both herein incorporated by reference.

BACKGROUND OF THE INVENTION

1. Field of the Invention

The invention relates to a clutch unit comprising a contact plate, by means of which by axial displacement a clutch disk bearing friction linings forms a frictional contact and can be pressed onto a pressure plate, wherein the axial displacement of the contact plate can be caused by an axial displacement of a lever spring plate with a circular outer circumference, which bears against one or more bumps that are arranged in an annular manner on a surface of the contact plate facing towards the lever spring plate at a radial distance from the outer edge thereof, and wherein the contact plate has a ring-like, axially projecting edge radially outside on its side facing towards the lever spring plate.

2. Description of the Background Art

Clutch units are known from DE 10 2008 031 953 A1, which discloses a clutch unit, in particular a double-clutch unit for use in a double-clutch transmission. The known double clutch comprises two clutch disks, which can be connected to different input shafts of a downstream gearshift unit, wherein the transmission has two partial transmissions, between which gears can be shifted in a load interruption-free manner. The clutch disks bear friction linings, which can be clamped axially between a pressure plate common to the two clutches and respectively one contact plate assigned to the respective clutch. The pressure plate is supported by a bearing on the transmission side and fixed in the axial direction in order to axially absorb the closing forces necessary for the friction clutches. The contact plates are connected to the pressure plate in a torque-proof manner yet axially displaceable to a limited extent. A diaphragm spring-like lever spring plate having lever elements arranged in an annular manner is assigned to each contact plate. The lever spring plates have diaphragm spring-like properties, thus can be changed in their conicity in a resilient manner. At least one of the lever spring plates is arranged directly adjacent to the contact plate assigned thereto. In particular its lever elements bear against bumps on the surface of the contact plate facing towards it. These bumps are spaced radially apart from the edge of the contact plate and respectively act as a tipping point for the respectively bearing lever element. To actuate the clutch, the central region of the lever spring plate is displaced axially so that the lever elements exert an axially directed force on the contact plate in order to thus cause a corresponding axial displacement of the clutch disk, i.e., the clutch disk is pressed to the pressure plate. The contact plate has an annular, axially projecting edge radially outside on its on its side facing towards the lever spring plate, against which edge the radially outer ends of the lever elements bear and on which the leverage acts.

A disadvantage of the known clutch unit is its susceptibility to soiling. For instance, the contact plate with its axially projecting edge and the lever spring plate with its lever elements bearing against the axially projecting edge form a quasi-closed space in which dust penetrating from outside and wear debris collecting from inside, hereinafter referred to jointly as "sediment," can be deposited. In the case of excessively thick sediment layers, obstruction of the mobility of the contact plate and thus difficulties in engaging gears can occur.

SUMMARY OF THE INVENTION

It is therefore an object of the present invention to further develop a generic clutch unit such that the danger of soiling by sediment is reduced.

This object is attained in an embodiment in that at least three radial projections spaced apart in the circumferential direction are arranged on the radially inner wall of the axially projecting edge, wherein a diameter of a circle tangent to the radial projections corresponds to the outer diameter of the lever spring plate, so that the lever spring plate is held centered on the radial projections and its outer edge is spaced apart between respectively two adjacent radial projections from the radially inner wall of the axially projecting edge.

Firstly, a change of the relative sizing of contact plate and lever spring plate compared to the prior art is provided. In particular, the outer diameter of the lever spring plate is smaller than the inner diameter of the axially projecting edge of the contact plate. The axially outer ends of the lever elements thus do not bear against the axially projecting edge. This can instead be used for centering the lever spring plate. However, it is provided according to an embodiment of the invention that the lever spring plate is not centered directly by the radially inner wall of the axially projecting edge, but indirectly via a plurality of radial projections, which extend radially inwards from the axially projecting edge. If precisely three such radial projections are provided, their radially innermost points describe a circle. If more than three projections are used, their inscribed circle is overdetermined. The diameter of the inscribed circle corresponds to the outer diameter of the lever spring plate. The lever spring plate can thus be inserted into the space between the projections and is therefore held centered by the projections. The outer edge of the lever spring plate is spaced apart from the axially inner wall of the axially projecting edge of the contact plate between respectively two adjacent projections. The contact plate and the lever spring plate thus no longer form a closed space. Sediment that penetrates from outside or has been generated inside by wear, is carried outwards by the centrifugal forces prevailing during operation and can escape through the gap produced according to the invention between the contact plate and the lever spring plate. A deposit that could lead to the buildup of thick layers of dirt thus does not occur.

Although it is possible to retrofit known contact plates with radial projections that are provided as separate elements, it is considered to be more favorable to embody the projections as cast lobes that are connected in a one-piece manner to the contact plate embodied as a metal casting. The Production of contact plates modified in this manner is much more cost-effective than a labor-intensive retrofitting with separate elements. Typically, the contact plate and the lever spring plate are surrounded by a hood-like housing cover. A housing cover of this type can have foot areas that are fixed to the pressure plate, for example, riveted thereto. Axially aligned support walls, which jointly bear a closing plate forming the actual cover, adjoin the foot areas. In other words, the closing plate, which is aligned essentially parallel to the pressure plate, connects the support walls spaced apart from one another in the circumferential direction. The regions between the support walls are typically penetrated positively by outer fixing tabs of the contact plate, whereby a securing against rotation is realized between the contact plate and the housing cover and thereby with the pressure plate. The slit-like regions between the outer edge of the contact plate and the inner surfaces of the support walls are also susceptible to the deposit of sediment. Sediment layers that are too thick in these regions can impair the mobility of the contact plate and thus the ease of the shifting operations. In order to achieve an improvement here, in a preferred embodiment of the invention it is provided that the support walls respectively have at least one outlet opening. Sediment that is driven by centrifugal force during operation onto the insides of the support walls can exit through these outlet openings to outside the housing. A collection and in particular a layer formation in the interior of the housing is thus reliably avoided.

Favorably, each support wall has a plurality of outlet openings, at least some of which are arranged axially offset to one another. The outlet openings axially offset to one another are additionally arranged in an axially overlapping manner. In this manner a discharge of the sediment over the entire height of the support walls can be ensured.

In order to facilitate the discharge of the sediment, it can be provided with an advantageous further development of the invention that guide channels directed towards the outlet openings are embodied on the radially inner side of each support wall. These can be shaped into the inner wall of the support walls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Identical reference numbers in the figures indicate identical or analogous elements. Position or direction information such as "top," "bottom," "right," "left," etc. refer respectively to the referenced figure and are not to be understood as limiting for the invention, which can be realized in any desired orientation.

Figure 1:
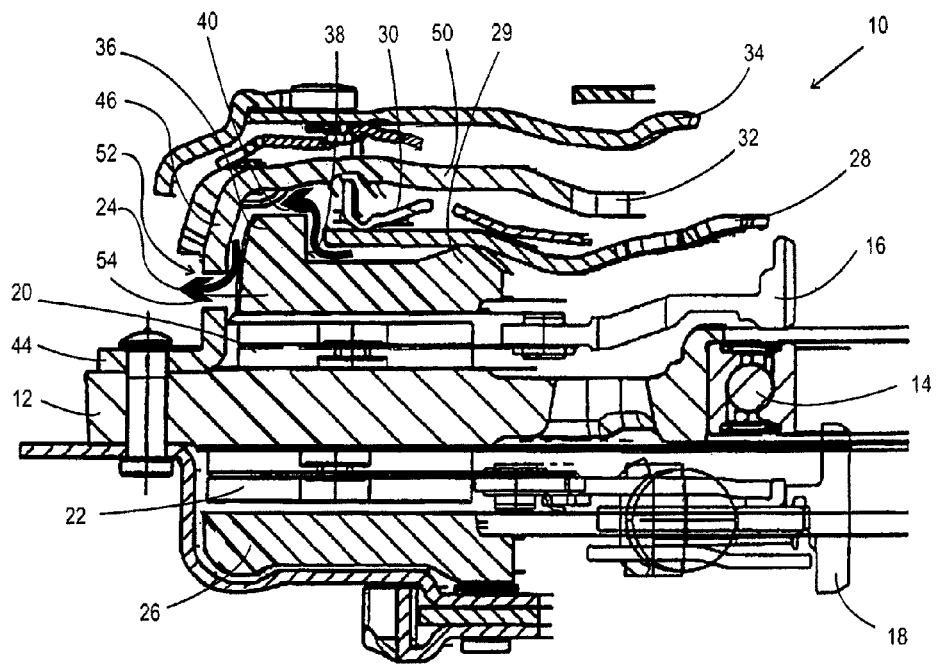
FIG. 1 illustrates a sectional representation through a clutch unit according to an embodiment of the invention.

FIG. 1 shows a sectional representation through a clutch unit 10 according to the invention. The clutch unit 10 has centrally a pressure plate 12, which is supported against a downstream transmission and axially supported by means of a bearing 14. Clutch disks 16, 18 are arranged on both sides of the pressure plate 12, which clutch disks in turn bear friction linings 20, 22. A contact plate 24, 26 is assigned to each clutch disk 16, 18. The upper contact plate 24 in FIG. 1 is in contact with a lever spring plate 28, which can be disengaged by a mechanism, not shown, such that it acts on the contact plate 24 with a pressure directed downwards in FIG. 1 so that it displaces the clutch disk 16 with its friction linings 20 against the pressure plate 12 and generates a frictional contact. To this end, the lever spring plate 28 bears against bumps 29 of the contact plate 24. The lever spring plate 28 is thereby supported via a synchronizer spring 30 against a housing cover 32. For actuation of the lower clutch disk 18 in FIG. 1 by means of the contact plate 26 assigned thereto, a second lever spring plate 34, which is coupled to the contact plate 26 in a manner not shown in detail, is disengaged.

The basic principle and the mode of operation of double-clutch units of this type is known from the prior art, in particular from the already cited DE 10 2008 031 953 A1, which is incorporated herein by reference, and therefore is not repeated here. The present invention relates to the specific embodiment of the upper contact plate 24 in FIG. 1, the assigned lever spring plate 28 and the housing cover 32. The other elements of the clutch unit known are not further discussed and/or can be embodied as disclosed in the cited publication, for example. The features according to the invention of the elements concerned by the invention can also be used in a different technical context from a double-clutch unit. For example, the features according to the invention can also be realized with a dry single clutch.

As can be seen in FIG. 1, a diameter of the contact plate 24 is larger than a diameter of the lever spring plate 28. The contact plate 24 according to the invention has an edge 36 radially outside, i.e. to the left in FIG. 1, which edge extends in the axial direction from the side of the contact plate 24 facing towards the lever spring plate 28. In other words, the edge 36 forms a wall surrounding the contact plate 24. The relative sizing of the lever spring plate 28 and the contact plate 24 is selected such that a slit-like gap lies between the radially inner rim 38 of the edge 36 and the outer circumference of the lever spring plate 28. This slit-like gap is suitable for releasing to the outside penetrated dust or wear debris, in short sediment, from the space between the contact plate 24 and the lever spring plate. The sediment outlet is driven by the centrifugal force that acts during the operation of the clutch unit 10. The approximate path of the sediment is indicated by the arrow 40.

Figure 2:
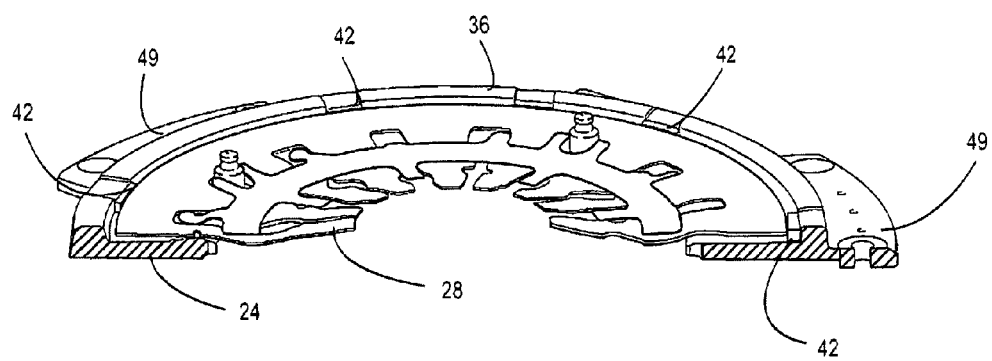
FIG. 2 illustrates a sectional perspective view of the contact plate and lever spring plate of the clutch unit of FIG. 1.

However, the slit-like gap does not run around the entire circumference of the whole lever spring plate 28. As can be seen in particular in FIG. 2, several projections projecting radially inwards are provided on the edge 36, which projections define (in the case shown, overdefine) a circle, which has the same circumference as the outer circumference of the lever spring plate 28. The lever spring plate 28 is thus held centered by the projections 42. The projections 42 take up only a very small portion of the total circumference so that they do not essentially obstruct the outflow of the sediment, as shown in FIG. 1.

Figure 3:
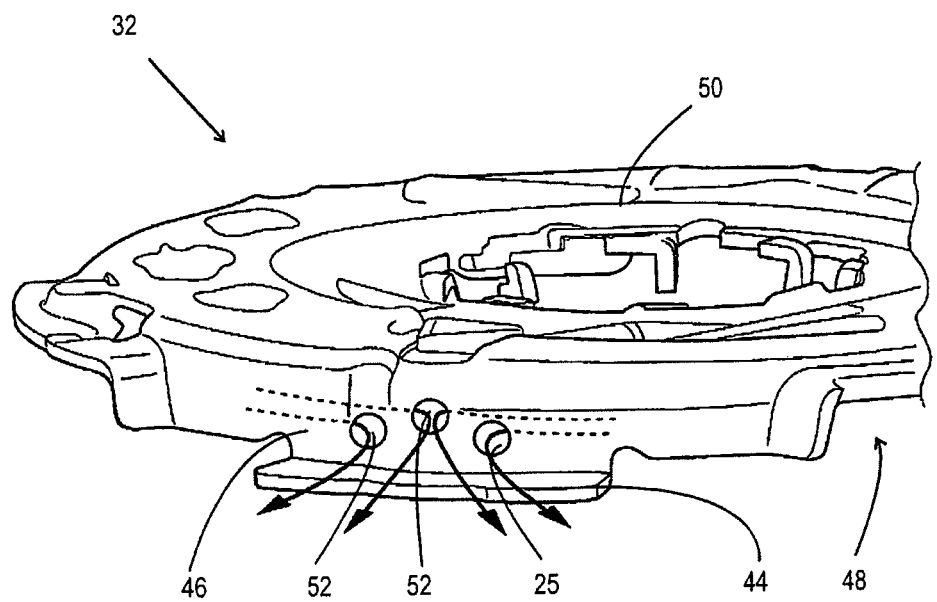
FIG. 3 illustrates a sectional perspective representation of a housing cover of the clutch unit of FIG. 1.

A further feature of the invention in its preferred embodiment relates to the housing cover 32, which is shown separately in FIG. 3. The housing cover 32 is essentially composed of several fixing feet 44, which, as is discernible in FIG. 1, are connected to the pressure plate 12. Support walls 46 extend upwards from the foot areas 44, which support walls are interrupted by recesses 48, which positively grip the fastening tabs 49 of the contact plate 24 (see FIG. 2). The actual housing cover is formed by a cover plate 50, which connects all of the support walls 46. Cutouts 52 are provided in the support walls 46, which cutouts, as shown in FIG. 1, permit an outflow of sediment out of the gap between the housing cover 32 and the contact plate 24 to outside the clutch unit 10. The outflow is indicated in FIG. 1 by the arrow 54.

Of course, the embodiments discussed in the specific description and shown in the figures represent only illustrative exemplary embodiments of the present invention. In the light of the disclosure here, the person skilled in the art is provided with a broad range of variation options. In particular, the invention is not limited to a use within the scope of a double-clutch unit, in particular a double-clutch transmission.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A clutch unit comprising:
a lever spring plate having a circular outer circumference;
a contact plate via which, by axial displacement, a clutch disk having friction linings is configured to be pressed against a pressure plate to form a frictional contact, the axial displacement of the contact plate is caused by an axial displacement of the lever spring plate, which bears against one or more bumps that are arranged in an annular manner on a surface of the contact plate facing towards the lever spring plate at a radial distance from an outer edge thereof, the contact plate having an annular axially projecting edge arranged radially outside on its side facing towards the lever spring plate; and
at least three radial projections spaced apart in a circumferential direction are arranged on a radially inner wall of the axially projecting edge,
wherein a diameter of a circle tangent to the radial projections corresponds to an outer diameter of the lever spring plate so that the lever spring plate is held centered on the radial projections and its outer edge is spaced apart between respectively two adjacent radial projections from the radially inner wall of the axially projecting edge.

2. The clutch unit according to claim 1, wherein the radial projections are formed as cast lobes and the contact plate is formed as a metal casting, and wherein the cast lobes and the metal casting are formed as one piece.

3. The clutch unit according to claim 1, wherein the contact plate and the lever spring plate are surrounded by a hood-shaped housing cover, which has foot areas fixed on the pressure plate and has axially extending support walls adjoining the foot areas and a closing plate connecting the support walls that are aligned substantially parallel to the pressure plate, and wherein the support walls have at least one radially aligned outlet opening.

4. The clutch unit according to claim 3, wherein each support wall has a plurality of outlet openings, and wherein at least some of the outlet openings are arranged axially offset to one another.

5. The clutch unit according to claim 3, wherein each support wall has a plurality of outlet openings, and wherein at least some of the outlet openings are arranged offset to one another and axially overlap one another.

6. The clutch unit according to claim 4, wherein air guide channels that are directed towards the outlet openings are arranged on the radially inner side of each support wall.

* * * * *